United States Patent [19]
Qi et al.

[11] Patent Number: 5,658,495
[45] Date of Patent: Aug. 19, 1997

[54] MN-DOPE NA-LI-TAENOLITE

[75] Inventors: Ru-Yi Qi, Whitmore Lake, Mich.;
Ronald E. Karam, Towanda, Pa.

[73] Assignee: Osram Sylvania Inc., Danvers, Mass.

[21] Appl. No.: 720,609

[22] Filed: Oct. 1, 1996

Related U.S. Application Data

[63] Continuation-in-part of Ser. No. 425,848, Apr. 20, 1995, Pat. No. 5,567,351, which is a continuation-in-part of Ser. No. 189,012, Jan. 28, 1994, abandoned, which is a continuation-in-part of Ser. No. 999,637, Dec. 31, 1992, abandoned.

[51] Int. Cl.$^6$ ............... C09K 11/69; C09K 11/59
[52] U.S. Cl. ............... 252/301.4 H; 252/301.4 R; 252/301.4 F
[58] Field of Search ............... 232/301.4 R, 301.4, 232/301.4 F

[56] References Cited

U.S. PATENT DOCUMENTS 5,531,926  7/1996  Qi et al. ............... 252/301.4 R

Primary Examiner—Melissa Bonner
Attorney, Agent, or Firm—William H. McNeill

[57] ABSTRACT

Inorganic intercalation phosphors were made by doping an inorganic intercalation compound having an atomic structure interspersed with vacant spaces with selected activator ions capable of luminescent emission when excited by cathode rays and having the general formula $Na_{1-x}Li_x(Mg_{2-y}Mn_y)LiSi_4O_{10}F_2$.

2 Claims, 2 Drawing Sheets

MN-DOPE NA-LI-TAENOLITE

CROSS-REFERENCE TO RELATED APPLICATIONS

This application is a continuation-in-part of application Ser. No. 08/425,848 filed Apr. 20, 1995, now U.S. Pat. No. 5,567,351, which is a continuation-in-part of Ser. No. 08/189,012, filed Jan. 28, 1995, now abandoned, which is a continuation-in-part of application Ser. No. 07/999,637, filed Dec. 31, 1992, now abandoned, the disclosures of which are hereby incorporated by reference.

The United States Government has rights in this invention pursuant to U.S. Government Contract No. DAAL01-92-C-0241.

TECHNICAL FIELD

This invention relates to phosphors and methods of making them. In particular, it relates to inorganic intercalation phosphors made by doping inorganic intercalation compounds with selected activator ions which, when excited by cathode rays or other exciting radiation, are capable of luminescent emission.

BACKGROUND ART

Phosphors are critical components in a number of lamp types, electroluminescent devices, and cathode ray tubes for televisions and computer monitors. Generally, the performance of these devices can be directly linked to the performance of the phosphors which they incorporate. Thus, in order to promote the evolution of these technologies, it is essential that new phosphors routinely be developed which could be used in those applications.

For cathode ray tube applications, it is necessary that phosphors luminesce when excited by cathode ray radiation (CR), which consists of high energy electrons. Phosphors which are excited by cathode rays are defined as being cathodoluminescent. Although it is desirable that cathodoluminescent phosphors emit light over the entire range of the visible spectrum, phosphors that emit red, green and blue light are particularly important for use in the manufacture of luminescent screens for televisions and computer monitors.

Thus, it would be an advantage in the art to provide novel phosphors which are capable of luminescent emission when excited by cathode rays.

DISCLOSURE OF THE INVENTION

It is an object of this invention to provide an inorganic intercalation phosphor capable of luminescent emission when excited by cathode rays.

It is a further object of this invention to provide a method for producing an inorganic intercalation phosphor.

In accordance with one aspect of the invention, there is provided an inorganic intercalation phosphor comprised of manganese activated sodium-lithium taeniolite having the general formula $Na_{1-x}Li_x(Mg_{2-y}Mn_y)LiSi_4O_{10}F_2$ and wherein x is from about 0.5 to about 0.6 and y is from about 0.04 to about 0.12.

BEST MODE FOR CARRYING OUT THE INVENTION

For a better understanding of the present invention, together with other and further objects, advantages and capabilities thereof, reference is made to the following specification and appended claims.

Figure 1:
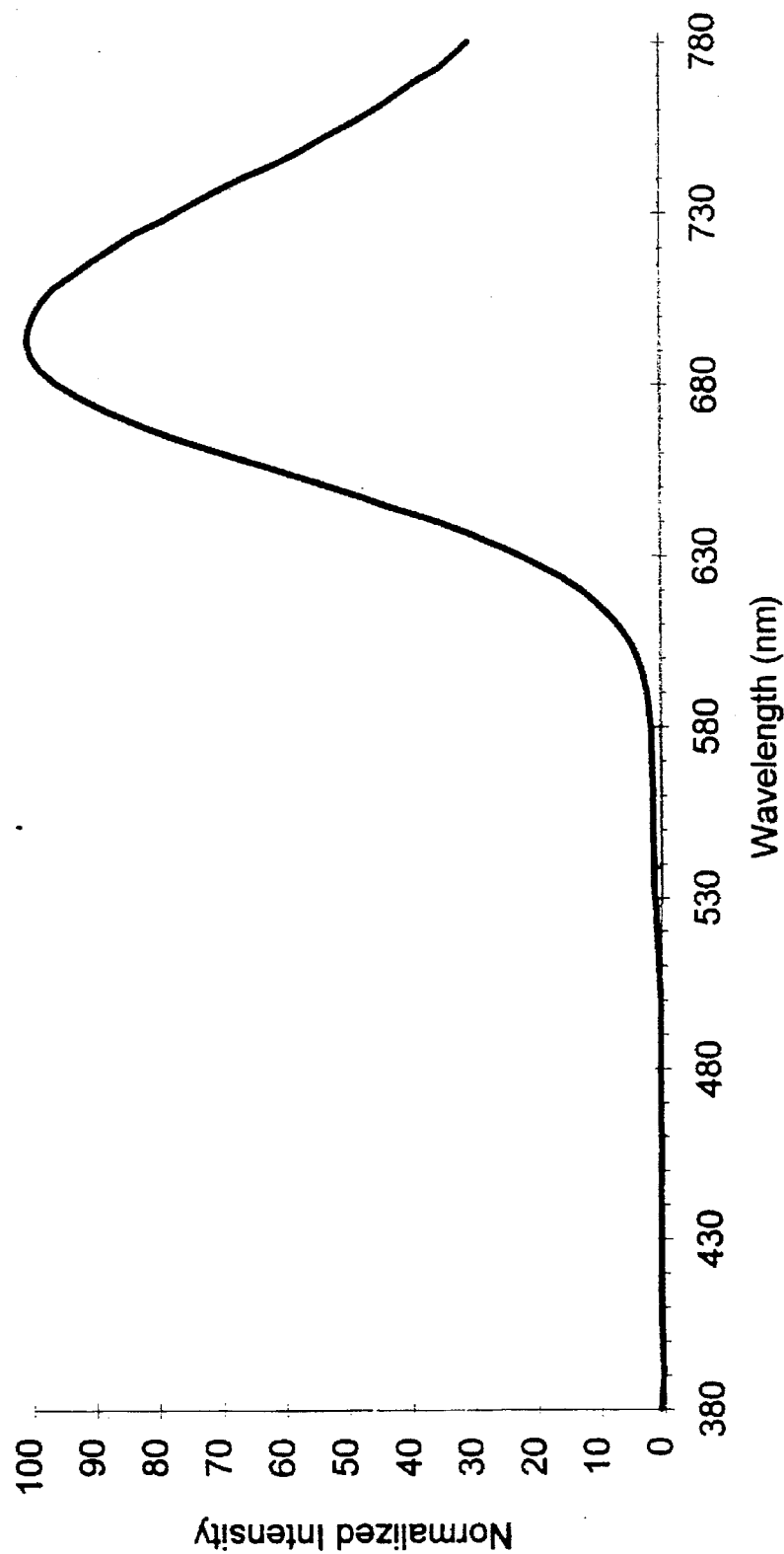
FIG. 1 is a graph of the CR emission spectrum for a phosphor of the invention.

The phosphor of the invention, $Na_{1-x}Li_x(Mg_{2-y}Mn_y)LiSi_4O_{10}F_2$, (x=0.5–0.6) is luminescent under cathode ray exitation and has a broad peak centered at about 692 nm, as will be seen from FIG. 1.

The phosphor was prepared by mixing appropriate mount of MgO, $SiO_2$, $Na_2CO_3$, $Li_2CO_3$, LiF, $Na_2SiF_6$, and $MnCO_3$ on a paint-shaker for 30 minutes. The starting materials thus mixed were charged into alumina crucibles and fired as follows: the temperature was increased from 950° C. to 1200° C. in 3 hours; held at 1200° C. for 2 hours; decreased to 930° C. in 2 hours; held at 930° C. for 10 hours; and decreased to 500° C. in 2 hours. The body color of the product was purple, even when fired in the reducing atmosphere produced by charcoal, an indication that the product contained $Mn^{4+}$. Therefore, the products were retired in 4% $H_2/N_2$ at 850° C. for 2 hours to further reduce $Mn^{4+}$ to $Mn^{2+}$. After the 2 hour firing the body color was nearly white and the material produced 1.33 fL optimum CRT brightness. The x-ray diffraction pattern showed the characteristic features for a layered compound and SEM photos indicated a layered morphology. The following examples show the real amounts of starting materials used in the reactions to make $Na_{0.4}Li_{0.6}(Mg_{2-y}Mn_y)LiSi_4O_{10}F_2$:

| | Example 1 | Example 2 | Example 3 | Example 4 | Example 5 |
|---|---|---|---|---|---|
| $SiO_2$ | 24.19 | 24.19 | 24.19 | 24.19 | 24.19 |
| $Na_2SiF_6$ | 3.29 | 3.29 | 3.29 | 3.29 | 3.29 |
| $Li_2CO_3$ | 2.33 | 2.33 | 2.33 | 2.33 | 2.33 |
| $Na_2CO_3$ | 0.3711 | 0.3711 | 0.3711 | 0.3711 | 0.3711 |
| MgO | 8.13 | 7.96 | 7.79 | 7.62 | 7.45 |
| LiF | 2.72 | 2.72 | 2.72 | 2.72 | 2.72 |
| $MnCO_3$ (moles of Mn/mole phosphor) | 0.4829 (0.04) | 0.7243 (0.06) | 0.9657 (0.08) | 1.2072 (0.10) | 1.4486 (0.12) |
| CR Brightness (foot-lamberts) | 1.09 | 1.16 | 1.30 | 1.33 | 1.21 |

Figure 2:
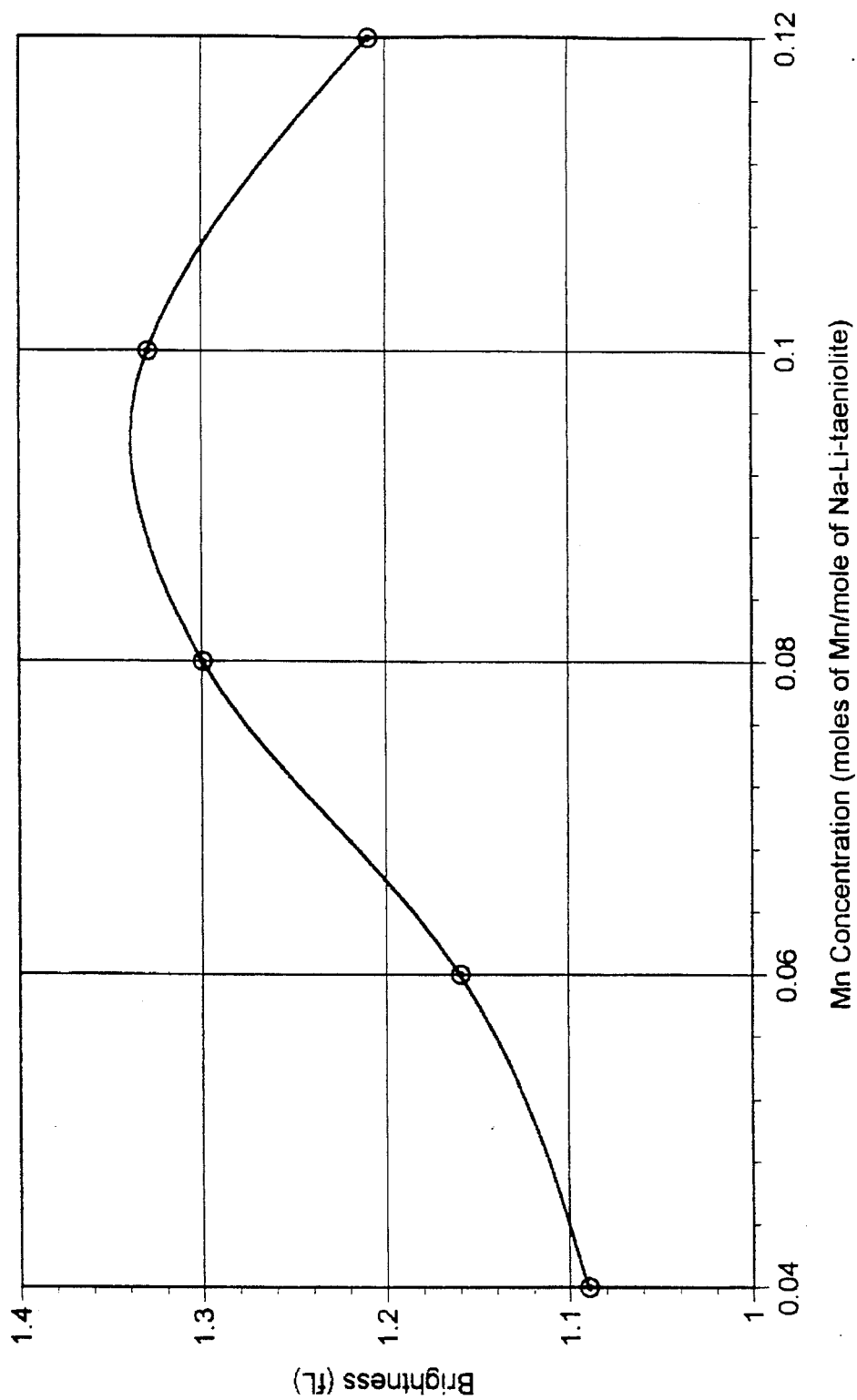
FIG. 2 is graph of the variation in CRT brightness for the phosphor of the invention relative to the concentration of activator.

At the doping levels indicated above, i.e., between 0.04 and 0.12 moles of Mn per mole of Na-Li-taeniolite, brightness varied, with the optimum brightness (1.33 fL) being realized at the doping level of 0.10. These latter data are plotted in FIG. 2.

While there have been shown what are at present considered to be the preferred embodiments of the invention, it will be apparent to those skilled in the art that various changes and modifications can be made herein without departing from the scope of the invention as defined by the appended claims.

What is claimed is:

1. A phosphor having the general formula $Na_{1-x}Li_x(Mg_{2-y}Mn_y)LiSi_4O_{10}F_2$, wherein x is from about 0.5 to about 0.6; and y is from 0.04 to about 0.12.

2. The phosphor of claim 1 wherein x=0.6.

* * * * *